Patented Nov. 13, 1951

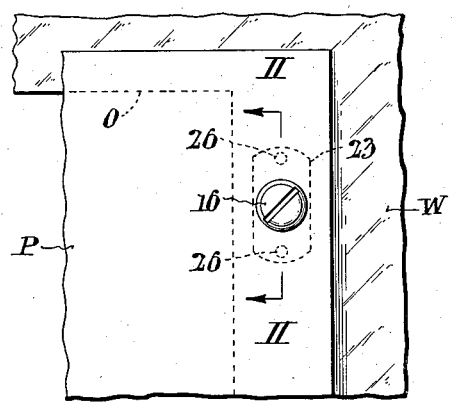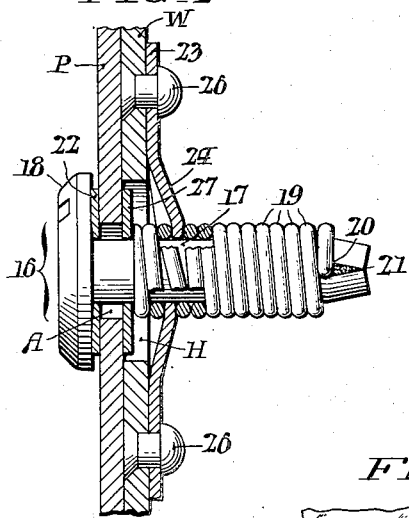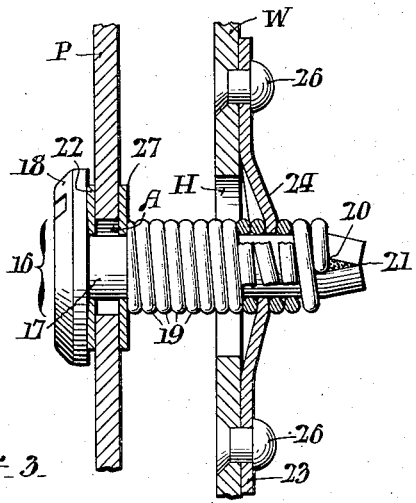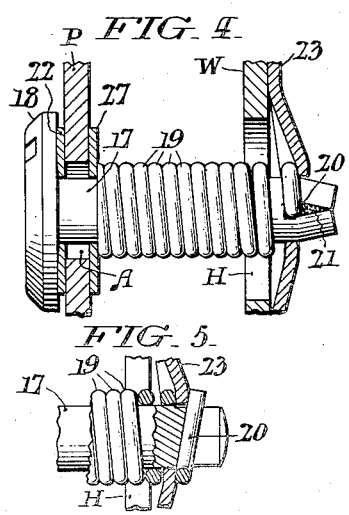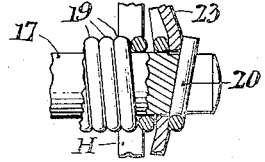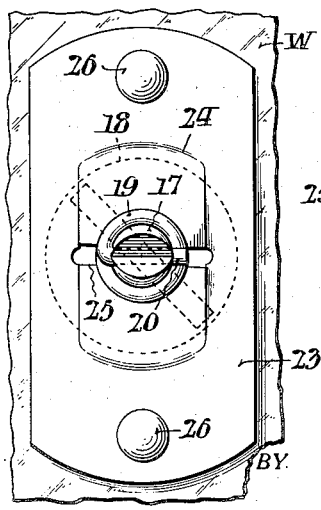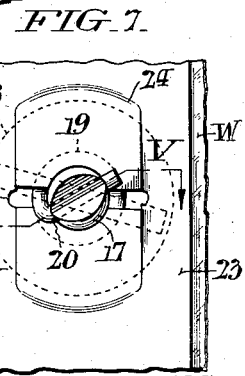

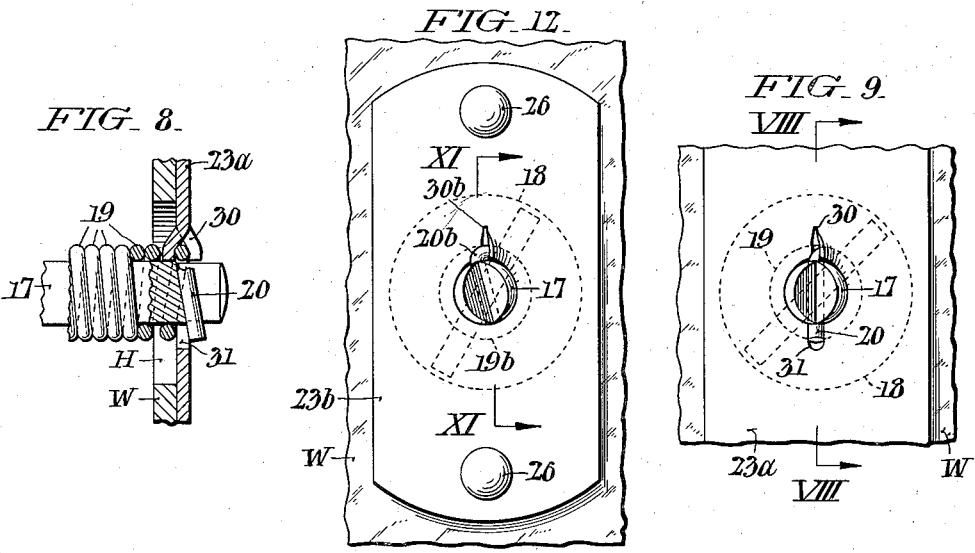
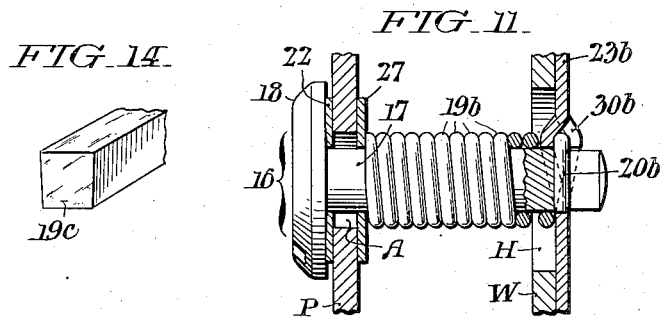
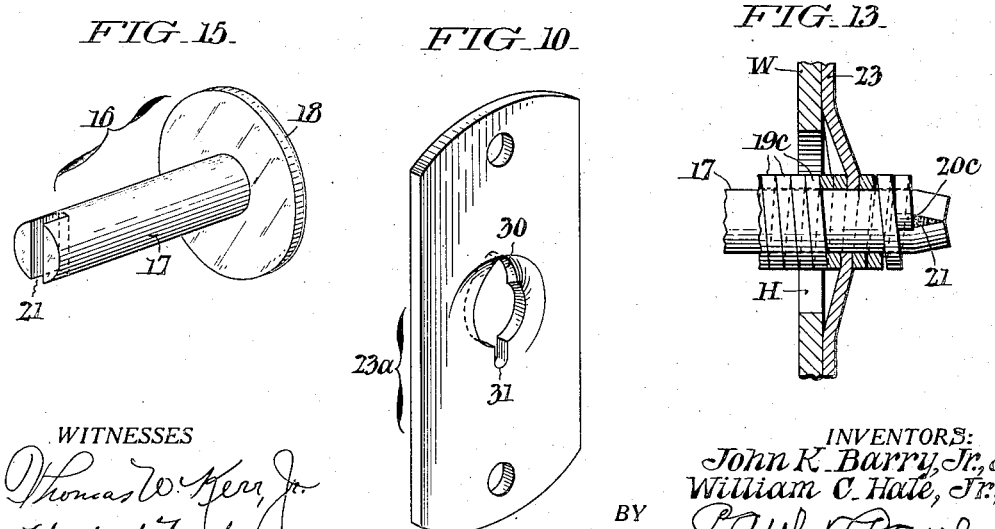

2,575,311

UNITED STATES PATENT OFFICE 2,575,311

SPRING THREADED BOLT FASTENING DEVICE

John K. Barry, Jr., Philadelphia, and William C. Hale, Jr., Chester, Pa., assignors to South Chester Corporation, Chester, Pa., a corporation of Delaware Application November 14, 1949, Serial No. 127,176

4 Claims. (Cl. 85—1)

This invention relates to fastening devices and particularly to fastening devices useful in securing, with capacity for ready removal, aircraft cowlings, automotive panels, grills, ornamental moldings, inspection plates, covers and the like.

The fastening devices heretofore generally used for the special purposes referred to above have been of the 90° turn and lock type, more or less like the device disclosed in U. S. Patent No. 1,955,740 granted to William Dzus on April 24, 1934, in which a stud with a spiral groove, rotatively mounted in the part to be secured, engages and locks with a spring bar element mounted on the fixed part. These prior art fastening devices, while permitting quick removal of the parts secured, were frequently rendered inoperative and unreliable through carelessness on the part of the mechanics in turning the studs beyond the prescribed limits, with consequent distortion or destruction of the parts by which the interlock was effected. Failures in service also frequently occurred as a consequence of movement of the connected members or elements relative to each other. The stresses occasioned by such movement resulted in wear of the parts of the fasteners with attendant change also in the aggregate thickness of the members attached. This aggregate thickness is a critical dimension and any substantial change therein rendered the fasteners inoperative. The shank lengths of these prior art devices had to be made to exact dimensions depending upon the thickness of the members to be secured. Accordingly, various sizes of fasteners had to be kept in stock by the users. Errors in selection as between the different stocked sizes invariably resulted either in injury to the devices themselves, or in loose coupling of the connected parts.

The chief aim of the present invention is to overcome the foregoing difficulties. This objective is attained, as hereinafter more fully disclosed, through provision of a simple and inexpensive fastening device, suitable for the above stated purposes, which cannot be easily injured or destroyed and which will permit relative rotation of the connected parts while resisting vibration and the tendency to become loose and without attendant damage either to it or to said parts.

Other objects and advantages will appear from the following detailed description of the attached drawings, wherein Fig. 1 is a fragmentary view in elevation showing the use of one form of fastening device of our invention as a means for securing a closure panel over an opening in a wall or partition.

Fig. 2 is a fragmentary view in vertical section taken as indicated by the angled arrows II—II in Fig. 1 and drawn to a larger scale.

Fig. 3 is a fragmentary view showing the rear elevation of the organization pictured in Fig. 1.

Figs. 4, 5 and 6 are sectional views like Fig. 2, showing, in successive stages, the operation of the device incident to tightening it.

Fig. 7 is a rear view like Fig. 3 but with the parts positioned as in Fig. 5 and with angled arrows V—V thereon indicating the plane of section of the latter illustration.

Figs. 8 and 9 correspond to Figs. 2 and 3, and show a modified embodiment of our invention, the plane of section of Fig. 8 being taken as indicated by the angled arrows VIII—VIII in Fig. 9.

Fig. 10 is a perspective view of the nut element employed in connection with the form of our invention shown in Figs. 8 and 9.

Figs. 11 and 12 are views in turn like Figs. 2 and 3 showing a modification, the plane of section in which Fig. 11 is taken being indicated by the angled arrows XI—XI in Fig. 12.

Fig. 13 is a sectional view, in turn like Fig. 2, showing still another modification.

Fig. 14 is a perspective view drawn to a magnified scale showing a fragment of wire from which the coiled spring employed in the modification of Fig. 13 is produced; and Fig. 15 is a perspective view of a stud element which is common to all of the several illustrated forms of our invention.

Referring first more particularly to Figs. 1–7 of these drawings, it will be observed that our improved fastening means in the embodiment there delineated includes a stud 16 having a shank 17 with a head 18 at one end which may be polygonal or winged for wrench or finger manipulation, or which may be round as shown and provided with a slot for use of a screw driver to turn it. Loosely surrounding the stud shank 17 is a helical spring 19 which, in this instance, is fashioned from relatively heavy, round section wire with a portion at one end thereof bent crosswise diametrically as at 20 and anchored in a clinched slot 21 at the distal end of said stud shank, the other end of the spring being finished off flat as shown in Fig. 2. Preferably, welding is resorted to, as conventionally indicated, to permanently seal up the clevised end of the stud shank 17 and thereby insure against subsequent spreading thereof. It is to be especially noted that the spring 19 is of less length than the stud shank 17 and terminates well short of the stud head 18, and that when completely relaxed as in Fig. 4, its convolutions are in direct mutual contact except for the two at the leading or anchored end thereof. Attention is also directed to the fact that the tip of the anchored terminal end of the spring projects laterally beyond the stud shank 17 to the outer periphery of the helix. The purpose of this construction and arrangement will be fully explained at a later point in this specification. When desired or required a washer 22 may be placed over the stud shank 17 before the spring is applied and permanently attached.

For use in association with the stud 16, we have shown a nut element 23 die stamped or otherwise produced from stiff sheet metal with a central apertured offset 24 and with a crosswise slot 25, said offset being so configured as to provide a single, segmented, internal screw thread. Other types of nut elements having two or more internal threads may be employed if desired in lieu of the single-threaded one shown.

In using the fastening device as a means for securing a panel such as shown at P in Figs. 1-4, over an opening O in a wall or partition W, the panel is initially provided with an aperture A of a diameter sufficiently large for passage of the spring 19 through it. The wall W is in turn provided with a registering hole H of larger diameter across which the nut element 23 is permanently secured as for example by means of rivets 26. As a preliminary step in assembling, the spring encircled shank is thrust through the operture A in the panel P until the washer 22 behind the head abuts the outer face of said panel, whereupon an auxiliary captive or retaining washer, such as shown at 27 in Fig. 2, is threaded onto the spring 19. A retaining washer suitable for this purpose is shown in U. S. Patent No. 2,470,927 dated May 24, 1949. The retaining washer 27 is advanced beyond the inner end of the spring 19 and ultimately flattened out for engagement of its full area with the inner face of panel P, as shown in Fig. 2. Thereafter the washer 27 serves as a means to hold the stud of the fastening device permanently assembled with the panel P. The panel is then brought up to the wall W and the clinched end of the stud shank 17 entered into the aperture of the nut element 23 as shown in Fig. 4. The device is thereupon tightened by turning the stud 16 clockwise after the manner of a right hand screw with the aid of a screw driver or other tool until the panel P is in full bearing contact with the wall W. Easy starting of the stud 16 is made possible due to the separation of the leading convolution of the helix from the remaining convolutions as will be readily understood from Fig. 4. During the first turn of the stud 16, the diametric end portion 20 of the helix 19 will find its way into and through the crosswise slot 25 of the nut element and immediately thereupon ride over the rear face of said nut element as shown in Figs. 5 and 7. In the continued turning of the stud 16, the convolutions of the helix 19 will be successively separated incident to coaction with the thread of the nut element 23 as shown in Fig. 6. When the stud 16 is drawn up to the fullest extent, as in Fig. 2, the helix 19 will be compressed with the space between its leading convolutions closed, and the entire portion thereof to the rear of the nut element will be "solid" as shown. Under these conditions, the panel P is effectively held in place with assurance against accidental loosening of the stud 16 through vibration even though the panel should shift rotatively relative to the wall.

The holding action of the helix 19 is due to the spring force which tends to close the coils spread by the nut element 23. Since the solid portion of the helix has the nature of a tension spring and since its convolutions therefore resist separation by advance of the stud in the nut element, they impart a frictional gripping or squeezing action upon the nut thread from opposite sides. As a result, the stud is restrained against loosening under vibration. Moreover, when the helix is fully engaged in the nut element 23 and the open entrant turns thereof are closed as in Fig. 2, the panel P will be held against the wall W under a constant compression load due to the tendency of the entrant turns of the helix to separate. The helix thus operates both as a compression and a tension spring means, the spaced convolutions at its leading end exerting the compressional force, and the mutually contacting turns exerting the tensional force to grip the nut element. It will further be seen that when the compression portion of the helix is completely closed or solid, partial rotation in a loosening direction can occur upon relative rotational movement of the connected parts, but the assembly may return to the normal or fully closed condition without disturbing the engagement between the helix and the nut element. Loosening through vibration of the attached parts is thus positively precluded in service. Furthermore, with the fastener fully tightened as in Fig. 2, the locking force of the helix will be parallel to the axis of the stud and thus act in a direction tending to remove the helix from the stud.

In instances where it is desired to allow motion to occur freely between the two parts united by the device, the latter is not fully drawn up, so that the complete collapse of the spaced end turns of the helix 19 is avoided. The spring 19 will nevertheless operate to prevent loosening of the device through the gripping action of its convolutions with the nut element 23. It will also be apparent that when the fastener is not fully drawn up, the stud can be partially rotated, thus tending to wind or to unwind before the frictional grip on the spring, of the nut element is exceeded. As a result, motion will be allowed to occur between the connected parts without loosening of the grip of the helix on the nut element.

As an alternative to the above integral construction, the retaining or captive washer 27 and the spring 19 may be assembled with the stud 16 subsequent to passage of the shank of the latter through the aperture A in the plate P. When this procedure is followed, a plain retaining washer with a hole corresponding in diameter to that of the stud shank 17 can be used in lieu of a retaining washer of the patented type hereinbefore referred to since the washer need not be threaded on. The washer 27 may of course be omitted in instances where permanent retainment of the device by the panel P is not desired.

In the embodiment shown in Figs. 8-10, all the parts except the nut element designated 23a are identical with those of the first described form of our invention, and designated by the same reference numerals previously employed. In this instance, the aperture in the nut element 23a is radially slitted at one point as at 30, and the metal thereabout is displaced to form the single female thread as best shown in Fig. 10. In accordance with our invention, the nut element 23a is additionally provided with a notch 31 opposite the slit 30 for clearance by the projecting tip of the end portion 20 of the spring 19, as shown in Figs. 8 and 9, as turning of the stud is initiated in attaching the panel to the wall W. The procedure followed in tightening the device of Figs. 8–10 and the action thereof are the same as described in connection with Figs. 1–7.

In the embodiment shown in Figs. 11 and 12, the nut element 23b is like the nut element 23a of Figs. 8–10 except for omission of the notch 31. A further difference to be noted here is that the diametral end portion of the spring 19b is terminated flush with the cylindric surface of the stud shank 17. In this instance, starting of the helix takes place simply by entry of the heel of the first convolution through the slit 30b of the orifice of the nut element 23b in a manner which will be obvious from Fig. 12.

While the last described construction is suitable for a great many purposes, the former types are preferable in that a balanced load is provided by virtue of the two load supporting points i. e., the points of contact of the second complete convolution of the spring with the heel and protruding tip of the anchored diametral cross portion of the spring 19, when the fastener is tightened and said spring is solid as in Figs. 2 and 3. Such load balancing permits higher tightening torques to be applied than practicable with the modified single point load support embodiment of Figs. 11 and 12.

Instead of a spring of round section wire, we may employ, a spring 19c such as shown in Fig. 13, fashioned from wire of trapeziform cross section depicted on an enlarged scale in Fig. 14. Thus instead of a mere line contact with a round wire spring, the convolutions of the alternative type of spring will contact with each other and with the nut element over substantial areas and so exert greater resistance to loosening of the device in service.

Having thus described our invention, we claim:

1. A fastening device comprising a stud having a head at one end, a helix of spring wire freely surrounding part of the length of the stud shank between the head and distal end, the convolutions of said helix being under such tension as to maintain said convolutions in direct contact with one another for substantially their entire length except for a few convolutions at the distal end which are spaced from one another and adapted to be put under compression, said helix being secured at its distal end to the shank at the end opposite the head but otherwise free to move in a direction parallel to the axis of the shank whereby said fastening device may be screwed through an opening in an element adapted to be engaged between said convolutions under tension to prevent loosening of the device under vibration.

2. A fastening device according to claim 1 wherein the end of the final open convolution is engaged in a clinched split at the distal end of the stud shank.

3. A fastening device according to claim 1 wherein the helix has a diametral end portion passed through the distal end of the stud shank with the tip thereof protruding laterally beyond the stud shank; and wherein the helix terminates short of the head of the stud.

4. A fastening device comprising a stud element with a head at one end and with a helix of spring wire freely surrounding part of the length of the stud shank between the head and distal end, the convolutions of said helix being under tension as to maintain said convolutions in direct contact with one another for substantially their entire length except for a few convolutions at the distal end, said helix having a diametral end portion anchored in the distal end of the stud shank with the tip of said end protruding laterally beyond the shank; and an associated nut element of sheet metal having an offset with an axial aperture of which the edge is spiralized to serve as a female thread in cooperation with the spring helix of the stud element with the convolutions in tension exerting a gripping action on said spiralized edge to prevent loosening of the device under vibration, the edge of said aperture being radially split at one point and notched at the diametrically opposite point for entry of the leading convolution of the helix and clearance of the protruding tip of the diametral end portion JOHN K. BARRY, Jr.
WILLIAM C. HALE, Jr.

REFERENCES CITED

The following references are of record in the file of this patent:

UNITED STATES PATENTS

| Number | Name | Date |
|---|---|---|
| 271,929 | Seybert | Feb. 6, 1883 |
| 561,579 | Gare | June 9, 1886 |
| 809,880 | Woolldridge | Jan. 9, 1906 |
| 1,062,635 | Clements | May 27, 1913 |
| 1,343,733 | Linden | June 15, 1920 |
| 2,113,789 | Hull | Apr. 12, 1938 |
| 2,470,927 | Hale | May 24, 1949 |

FOREIGN PATENTS

| Number | Country | Date |
|---|---|---|
| 428,122 | France | Aug. 23, 1911 |
| 436,762 | Germany | Aug. 18, 1925 |